(12) United States Patent
Cociglio

(10) Patent No.: US 11,258,581 B2
(45) Date of Patent: Feb. 22, 2022

(54) METHOD FOR TRANSMITTING ENCRYPTED PACKETS IN A COMMUNICATION NETWORK

(71) Applicant: Telecom Italia S.p.A., Milan (IT)

(72) Inventor: Mauro Cociglio, Turin (IT)

(73) Assignee: Telecom Italia S.p.A., Milan (IT)

( * ) Notice: Subject to any disclaimer, the term of this patent is extended or adjusted under 35 U.S.C. 154(b) by 317 days.

(21) Appl. No.: 16/468,194

(22) PCT Filed: Dec. 15, 2016

(86) PCT No.: PCT/EP2016/081140
§ 371 (c)(1),
(2) Date: Jun. 10, 2019

(87) PCT Pub. No.: WO2018/108274
PCT Pub. Date: Jun. 21, 2018

(65) Prior Publication Data
US 2019/0334696 A1    Oct. 31, 2019

(51) Int. Cl.
*H04L 9/06*    (2006.01)
*G06F 7/58*    (2006.01)
*H04L 29/06*    (2006.01)

(52) U.S. Cl.
CPC .......... *H04L 9/0618* (2013.01); *G06F 7/588* (2013.01); *H04L 63/0435* (2013.01); *H04L 2209/20* (2013.01)

(58) Field of Classification Search
CPC .... H04L 2209/20; H04L 9/0618; G06F 7/588
See application file for complete search history.

(56) References Cited

U.S. PATENT DOCUMENTS

| | | | | |
|---|---|---|---|---|
| 6,704,871 B1* | 3/2004 | Kaplan | ............ | G06F 21/72 713/192 |
| 6,918,034 B1* | 7/2005 | Sengodan | ........ | H04L 63/0428 370/473 |
| 2003/0156715 A1* | 8/2003 | Reeds, III | ........ | H04L 9/12 380/37 |
| 2007/0255941 A1 | 11/2007 | Ellis | | |
| 2014/0079213 A1 | 3/2014 | Jacobson et al. | | |

(Continued)

OTHER PUBLICATIONS

Wojciech Mazurczyk et al, "Information Hiding in Communication Networks: Fundamentals, Mechanisms, Applications and Countermeasures", John Wiley & Sons, Feb. 29, 2016, pp. 119 and 120.

(Continued)

*Primary Examiner* — Ellen Tran
(74) *Attorney, Agent, or Firm* — Banner & Witcoff, Ltd.

(57) ABSTRACT

A method is provided for transmitting encrypted packets from a first node to a second node of a communication network. The first node pads each plaintext packet with a respective padding content. The padded plaintext packets are then encrypted and transmitted to the second node. For each plaintext packet, the first node randomly selects the padding size in a range comprised between a minimum padding size and a maximum padding size. If the size of a plaintext packet is lower than a predefined minimum packet size, the minimum padding size is set equal to the difference between predefined minimum packet size and the plaintext packet size.

15 Claims, 6 Drawing Sheets

(56) References Cited

U.S. PATENT DOCUMENTS

2016/0070771 A1* 3/2016 Vermeulen .......... G06F 11/3006
707/687

OTHER PUBLICATIONS

Kevin P Dyer et al: "Peek-a-Boo, I Still See You: Why Efficient Traffic Analysis Countermeasures Fail", 2012 IEEE Symposium on Security and Privacy (SP), May 20, 2012, pp. 332-346, XP032456296.
Jun. 21, 2018—(WO) Int'l Search Report & Written Opinion of the ISA—App PCT/EP2016/081140.

* cited by examiner

METHOD FOR TRANSMITTING ENCRYPTED PACKETS IN A COMMUNICATION NETWORK

TECHNICAL FIELD

The present invention relates to the field of communication networks. In particular, the present invention relates to a method for transmitting encrypted packets in a communication network. Further, the present invention relates to a node for communication network configured to implement such method, to a communication network comprising such node and to a computer program product performing the method steps when the product is run on a computer.

BACKGROUND ART

In a packet-switched communication network, data are transmitted in the form of packets that are routed from a source node to a destination node through possible intermediate nodes. Exemplary packet-switched networks are IP (Internet Protocol) networks, Ethernet networks and MPLS (Multi-Protocol Label Switching) networks.

In order to increase security of the network and protect it against eavesdropping, encryption techniques are known. As known, encryption is a process of encoding packets before their transmission, so that only authorized parties can read their content. Hence, encryption does not prevent eavesdropping as such, but denies the packet content to unauthorized parties.

Typically, packets (also termed herein after "plaintext packets") are encrypted by applying thereto an encryption algorithm, so as to obtain an encrypted packet. Several encryption algorithms are known, including block cipher encryption algorithms. Such encryption algorithms typically operate on fixed-sized groups of bytes, called "blocks". Hence, given a block size of B bytes, application of the encryption algorithm causes the packet size to be rounded up to the nearest integer multiple of B.

Besides, encrypted packets also typically comprise an overhead of size OH, which typically comprises security information e.g. for authentication purposes or the like.

Hence, the size L' of an encrypted packet is typically higher than the size L of the corresponding plaintext packet, the relationship between L and L' being known a priori and depending both from the block length B ad the overhead length OH according to the following equation:

$$L' = \left[\text{int}\left(\frac{L}{B}\right) \cdot B\right] + OH \quad [1]$$

For instance, Internet Protocol Security (IPsec) is a protocol suite for secure Internet Protocol (IP) which provides for encrypting each IP packet transmitted during a certain IP session. IPsec in particular provides for encrypting IP packets using a block cipher encryption algorithm (HMAC-SHA1/SHA2, TripleDES-CBC, AES-CBC or AES-GCM) with a block size of B=16 bytes. Furthermore, the Encapsulating Security Payload (ESP)—which is a member of the IPsec protocol suite defining the format of IPsec packets—provides for inserting an overhead of OH=122 bytes in each encrypted packet (also termed IPsec packet). The size L' (in bytes) of an IPsec packet therefore depends on the size L (in bytes) of the corresponding IP packet according to the following equation:

$$L' = \left[\text{int}\left(\frac{L}{16}\right) \cdot 16\right] + 122 \quad [1']$$

The deterministic relationship between size of plaintext packets and size of encrypted packets may be detrimental to the network security.

Indeed, as disclosed by Wojciech Mazurczyk et al., "Information Hiding in Communication Networks: Fundamentals, Mechanisms, Applications, and Countermeasures", John Wiley & Sons, 29 Feb. 2016, pages 119 and 120, while encryption hides packet contents, traffic patterns, such as packet timings and packet size, can potentially reveal critical information about the content being communicated. In particular, analysing the packet sizes of encrypted web traffic can give away the identities of the websites visited by users. To counter this, several proposals have suggested to pad encrypted packets to conceal the actual size of plaintext packets. The proposed padding techniques include:

1. session random padding: a padding size p is randomly chosen from a set {0, 8, 16, . . . M–I}, where I the plaintext packet size before padding and M is the maximum transmission unit (MTU), namely the size of the largest protocol data unit defined in the protocol's standard. Hence, every plaintext packet to be transmitted in certain session is padded with a dummy plaintext of size p;
2. packet random padding: every single packet is padded with a dummy content of a randomly chosen size, independently chosen across all the packets in a session;
3. linear padding: packets are padded so that all packet sizes are increased to the nearest multiple of 128 bytes, or the MTU, whichever is smaller;
4. exponential padding: all packets are padded to the nearest power of 2, or the MTU, whichever is smaller;
5. mice-elephants padding: the packets smaller than 128 bytes are padded to 128 bytes; all the other packets are padded to the MTU; and
6. pad to MTU: all packets are padded to the MTU size.

SUMMARY OF THE INVENTION

The Applicant has noticed that the known padding techniques cited above have some drawbacks.

As to the techniques session random padding, packet random padding, linear padding, exponential padding and mice-elephants padding, they disadvantageously are not capable of efficiently masking shorter packets. Indeed, according to such techniques, shorter encrypted packets (where "shorter" is referred to the statistical distribution of the encrypted packet sizes) can derive only from shorter plaintext packets (where "shorter" is referred to the statistical distribution of the plaintext packet sizes). This disadvantageously enables an unauthorized party eavesdropping a flow of encrypted packets to easily identify amongst them the ones carrying shorter plaintext packets.

As to the technique pad to MTU, it masks shorter packets (all the plaintext packets are padded to the same size MTU, independently of their original size) but, as a drawback, it typically entails a consistent waste of bandwidth. For example, according to the IP protocol the MTU is 1500 bytes. However, the typical average size of IP packets transmitted over the Internet ranges between 500 bytes and 600 bytes. This means that the bandwidth needed for transmitting an encrypted packet padded according to pad to MTU is about tripled by the padding.

In view of the above, the Applicant has tackled the problem of providing a method for transmitting encrypted packets in a communication network which overcomes the aforesaid drawbacks.

In particular, the Applicant has tackled the problem of providing a method for transmitting encrypted packets in a communication network making use of a padding technique for hiding the plaintext packet sizes, which allows efficiently hiding the shorter plaintexts packet sizes and which, at the same time, allows reducing the bandwidth consumption entailed by the padding.

According to embodiments of the present invention, the above drawbacks are solved by padding each plaintext packet, before its encryption, with a padding content whose padding size is randomly selected, independently for each plaintext packet, in a range comprised between a minimum padding size $PS_{min}$ and a maximum padding size $PS_{max}$, wherein for each plaintext packet whose size is lower than a predefined minimum packet size $TS_{min}$, the minimum padding size $PS_{min}$ is equal to the difference between the predefined minimum packet size $TS_{min}$ and the plaintext packet size.

The randomly padded plaintext packets are then encrypted and transmitted.

This way, the random padding advantageously brings all the plaintext packets, before encryption, to sizes randomly ranging in a range inferiorly limited by the predefined minimum packet size $TS_{min}$.

On the one hand, choosing the padding size so as to bring the plaintext packets to random sizes advantageously entails a bandwidth consumption lower than padding all the plaintext packets to a same maximum packet size. Hence, the bandwidth consumption entailed by the padding of the present invention is advantageously reduced in comparison to the above technique pad to MTU.

On the other hand, choosing the padding size so as to bring the plaintext packet to a random size comprised in a range inferiorly limited by the predefined minimum packet size $TS_{min}$ advantageously results in an efficient hiding of the shorter plaintext packet sizes, namely of those lower than the minimum packet size $TS_{min}$.

According to a first aspect, the present invention provides a method for transmitting encrypted packets from a first node to a second node of a communication network, the method comprising, at the first node:

a) padding a plaintext packet with a padding content, thereby providing a padded plaintext packet;

b) providing an encrypted packet by encrypting the padded plaintext packet; and c) transmitting the encrypted packet from the first node to the second node, wherein the padding content has a padding size and wherein step a) comprises randomly selecting the padding size in a range comprised between a minimum padding size and a maximum padding size, wherein, if the size of the plaintext packet is lower than a predefined minimum packet size, the minimum padding size is equal to the difference between the predefined minimum packet size and the plaintext packet size.

Preferably, if the size of the plaintext packet is equal to or higher than the predefined minimum packet size, the minimum padding size is set equal to 0.

Preferably, the maximum padding size is equal to the difference between a predefined maximum packet size and the plaintext packet size.

According to some embodiments, the padding size is selected as a random integer Z comprised between a minimum value X and a maximum value Y, where Z is the padding size expressed in number of blocks of B bytes, X is the minimum padding size expressed in number of blocks of B bytes and Y is the maximum padding size expressed in number of blocks of B bytes, step b) comprising encrypting the padded plaintext packet by applying a block cipher encryption algorithm with a block size of B bytes.

Preferably, the random integer Z is selected by drawing one or more values of a discrete random variable z having a probability mass function $p_Z(z)$, the probability mass function $p_Z(z)$ being constant for z comprised between X and Y.

According to other embodiments, the random integer Z is selected by drawing one or more values of a discrete random variable z having a probability mass function $p_Z(z)$, the probability mass function $p_Z(z)$ being a decreasing function for z comprised between X and Y, the probability mass function $p_Z(z)$ having a maximum value at z=X and a minimum value at z=Y, the ratio between the maximum value and the minimum value having a value RP.

Optionally, the probability mass function $p_Z(z)$ is variable over time and/or on a client or session basis.

According to first variants, the probability mass function $p_Z(z)$ is a linearly decreasing function for z comprised between X and Y.

According to second variants, the probability mass function $p_Z(z)$ is a non-linearly decreasing function for z comprised between X and Y.

According to the first variants, the random integer Z is preferably selected by:

providing a first array AP(j), j being an index ranging between 1 and N=Y−X+1, with AP(j−1)−AP(j)=RP−1;

providing a second array APC(i), i being an index ranging between 1 and N=Y−X+1, wherein:

$$APC(i) = \sum_{j=1}^{i} AP(j)$$

drawing a random number R in a range comprised between 1 and APC(N), the probability mass function of the random variable r providing the random integer R being constant for r between 1 and APC(N);

the random number R is compared with every element of the second array APC(i) in an ordered way, starting from the first element APC(1) and, the first time the random number R results to be lower than or equal to one element APC(i*) of the second array, then Z is set equal to X+i*−1.

According to the second variants, the random integer number Z is preferably selected by:

drawing a random integer R comprised between 1 and a maximum number of draws NMS, indicating the number of draws to be performed;

drawing R random integers comprised between X and Y; and setting Z equal to the minimum one amongst the R drawn random integers, wherein the probability mass function of the random variable providing the random integer R is constant between 1 and NMS, and wherein the probability mass function of the random variable providing the R random integers is constant between X and Y.

Alternatively, the random integer number Z is selected by:
drawing a number N>1 of random integers $R_1, R_2, \ldots R_N$, $R_1$ being selected between 1 and a maximum number of draws NMS and $R_i$ with i>1 being selected between 1 and $R_{i-1}$;

drawing $R_N$ random integers comprised between X and Y; and setting Z equal to the minimum one amongst the $R_N$ drawn random integers, wherein the probability mass function of the random variable providing the N random integers $R_1, R_2, \ldots R_N$ is constant, and wherein the probability mass function of the random variable providing the $R_N$ random integers is constant between X and Y.

Still alternatively, the random integer number Z is selected by:
drawing N>1 random integers $R_1, R_2, \ldots R_N$ comprised between 1 and a maximum number of draws NMS;

setting $R_{min}$ equal to the minimum one amongst the N random integers $R_1, R_2, \ldots R_N$;

drawing $R_{min}$ random integers comprised between X and Y; and setting Z equal to the minimum one amongst the $R_{min}$ drawn random integers, wherein the probability mass function $p_R(r)$ of the random variable r providing the N random integers $R_1, R_2, \ldots R_N$ is constant between 1 and NMS, and wherein the probability mass function $p_T(t)$ of the random variable t providing the $R_{min}$ random integers is constant between X and Y.

According to a second aspect, the present invention provides a node for a packet switched communication network, the node comprising:
a padding unit configured to pad a plaintext packet with a padding content, thereby providing a padded plaintext packet;

an encryption unit configured to provide an encrypted packet by encrypting the padded plaintext packet; and a transmitting unit configured to transmit the encrypted packet from the node to a further node of the communication network, wherein the padding unit is configured to generate the padding content with a padding size, by randomly selecting the padding size in a range comprised between a minimum padding size and a maximum padding size, wherein, if the size of the plaintext packet is lower than a predefined minimum packet size, the padding unit is configured to set the minimum padding size equal to the difference between the predefined minimum packet size and the plaintext packet size.

According to a third aspect, the present invention provides a communication network comprising at least a node as set forth above.

According to a fourth aspect, the present invention provides a computer program product loadable in the memory of a computer and including software code portions for performing the steps of the method as set forth above, when the product is run on said computer.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
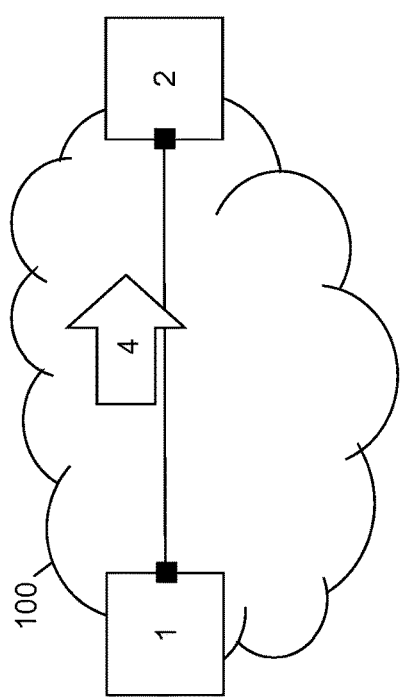
FIG. 1 schematically shows an exemplary packet-switched network implementing the method according to embodiments of the present invention.

FIG. 1 schematically shows an exemplary packet-switched communication network 100 implementing the method for transmitting encrypted packets according to embodiments of the present invention. The communication network 100 may be an IP network, an Ethernet network, an MPLS network or any other known type of packet-switched communication network.

The communication network 100 comprises a plurality of nodes reciprocally interconnected by links according to any known topology. In particular, the communication network 100 comprises a first node 1 and a second node 2.

As it will be described in further detail herein after, the first node 1 is preferably configured to transmit a flow of encrypted packets 4 to the second node 2.

Figure 2:
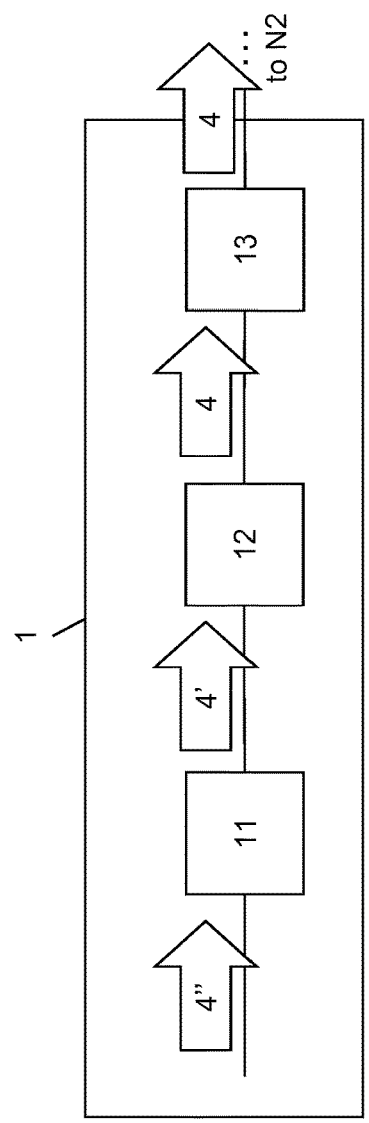
FIG. 2 schematically shows in further detail a node of the network of FIG. 1.

In particular, as shown in FIG. 2, the first node 1 preferably comprises a padding unit 11, an encryption unit 12 and a transmitter 13.

The padding unit 1 is preferably configured to receive a flow of plaintext packets 4" and to pad each packet, thereby providing a flow of padded plaintext packets 4'.

The flow of plaintext packets 4" may be either generated at the first node 1, or it may be received at the first node 1 from a packet source comprised in or external to the communication network 100. Besides, the flow of plaintext packets 4" may be addressed to the second node 2 or to a packet destination comprised in or external to the communication network 1.

Further, the flow of plaintext packets 4" may comprise packets generated by a same source node and addressed to a same destination node. Alternatively, the flow of plaintext packets 4" may be a "macro-flow" comprising packets generated by different source nodes and/or addressed to different destination nodes, which only share a length of their paths between the first node 1 and the second node 2.

By referring again to FIG. 2, the encryption unit 12 is preferably configured to receive the flow of padded plaintext packets 4' from the padding unit 11 and to encrypt them, so as to provide the encrypted packet flow 4.

The transmitter 13 is finally configured to receive the encrypted packet flow 4 from the encryption unit 12 and to transmit it to the second node 2.

The processing of each plaintext packet by the first node 1 will be now described in further detail with reference to the flow chart of FIG. 3.

As the padding unit 11 receives a plaintext packet (step 300), it preferably pads it to a random packet size comprised between a predefined minimum packet size $TS_{min}$ and a predefined maximum packet size $TS_{max}$.

In particular, if L is the size of the received plaintext packet received at step 300, the padding unit 11 preferably calculates a maximum padding size $PS_{max}$ as the difference between said predefined maximum packet size $TS_{max}$ and the plaintext packet size L (step 301). Preferably, the predefined maximum packet size $TS_{max}$ has a same value for all the received plaintext packets, independently of their size. According to preferred embodiments, the predefined maximum packet size $TS_{max}$ is equal to the maximum packet size allowed by the transmission protocol of the plaintext packets.

For instance, in case of IP packets, the maximum packet size allowed by the IP protocol is 1504 bytes. Hence, at step 301, the predefined maximum packet size $TS_{max}$ may be set equal to 1504 bytes, and accordingly the maximum padding size $PS_{max}$ for a plaintext IP packet of size L (in bytes) may be calculated as $PS_{max}=1504-L$.

Then, the padding unit 11 preferably determines whether the size L of the plaintext packet received at step 300 is lower than a predefined minimum packet size $TS_{min}$ (step 302). The predefined minimum packet size $TS_{min}$ is preferably selected based on the statistical distribution of the size of plaintext packets. In particular, the minimum packet size $TS_{min}$ is preferably selected so that 30%, more preferably 40%, even more preferably 50% of the plaintext packets is shorter than $TS_{min}$. This way, if a padded plaintext packet of length $TS_{min}$ is found, it is almost impossible making any assumption on its original size L. For instance, for IP networks the minimum packet size $TS_{min}$ may be set to 128 bytes or 256 bytes.

If the size L of the received plaintext packet is lower than the predefined minimum packet size $TS_{min}$, the padding unit 11 preferably calculates a minimum padding size $PS_{min}$ as the difference between said predefined minimum packet size $TS_{min}$ and the plaintext packet size L (step 303).

If, instead, the size L of the received plaintext packet is equal to or higher than the predefined minimum packet size $TS_{min}$, the padding unit 11 preferably sets the minimum padding size $PS_{min}$ equal to 0 (step 304).

Then, the padding unit 11 preferably determines a padding size PS for the plaintext packet received at step 300 (step 305). To this purpose, the padding unit PS preferably randomly selects the padding size PS in a range comprised between the minimum padding size $PS_{min}$ calculated at step 303 or 304 and the maximum padding size $PS_{max}$ calculated at step 301. Further details on the random selection of the padding size PS according to preferred embodiments of the present invention will be provided herein below.

Then, the padding unit 11 preferably generates a padding content of size PS as determined at step 305 (step 306). Preferably, the padding content is predetermined and known also at the node N2 receiving the encrypted packet flow 4. For instance, the padding content may be one bit equal to "1" followed by PS-1 (in bits) bits equal to "0". This way, the node N2 may readily recognize the padding content after decryption, and remove it in order to recover the plaintext packet.

The padding unit 11 then preferably adds the padding content generated at step 306 to the plaintext packet (step 307), thereby providing to the encryption unit 12 a padded plaintext packet having a random size comprised between the predefined minimum packet size $TS_{min}$ and the predefined maximum packet size $TS_{max}$.

The encryption unit 12 preferably encrypts the padded plaintext packet (step 308), thereby providing to the transmitter 13 an encrypted packet. The encryption step may be carried out according to any known encryption protocol, such as e.g. HMAC-SHA1/SHA2, TripleDES-CBC, AES-CBC or AES-GCM.

The transmitter 13 finally transmits the encrypted packet to the second node N2 through the communication network 100.

Figure 3:
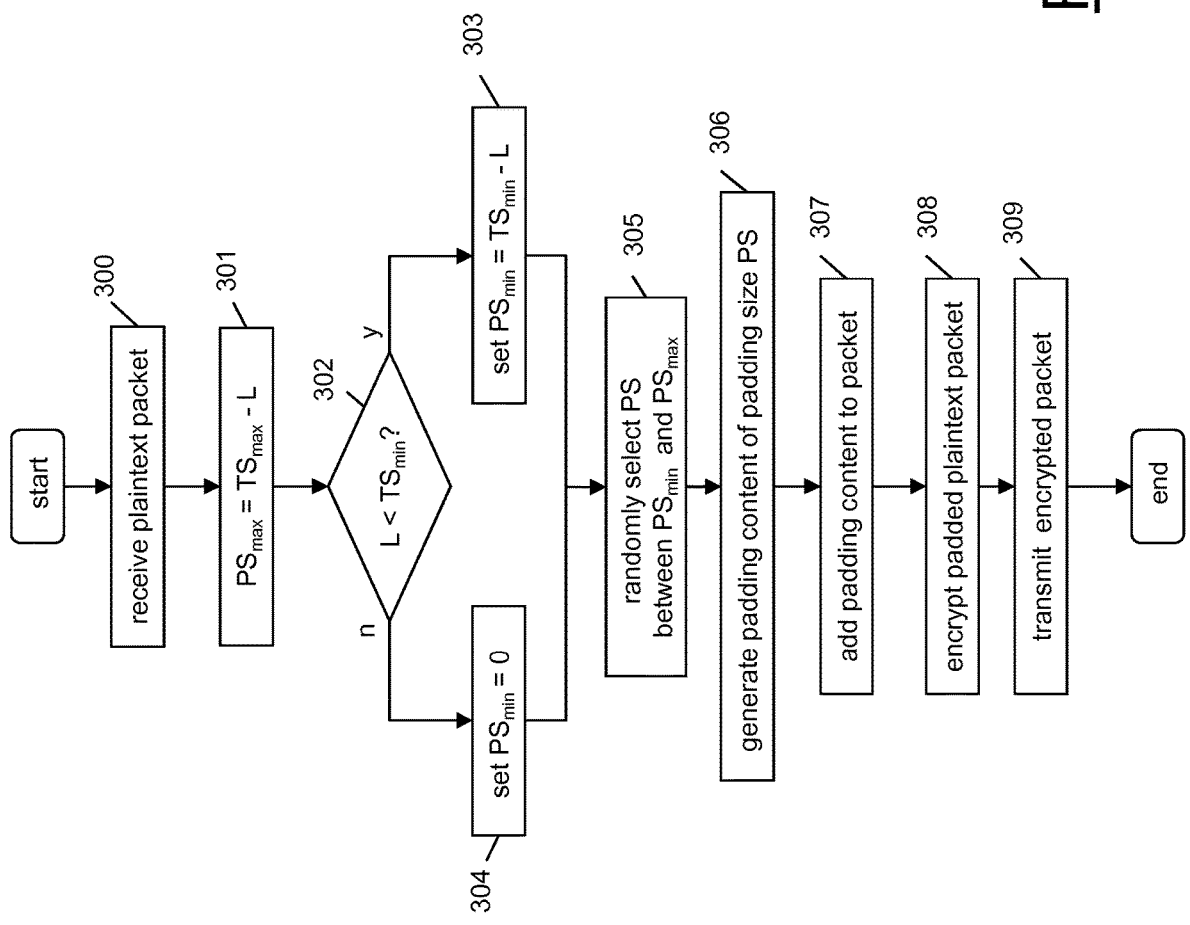
FIG. 3 is a flow chart of the operation of the node shown in FIG. 2.

The random padding of the flow chart of FIG. 3 therefore brings all the plaintext packets, before encryption, to sizes randomly ranging between the predefined minimum packet size $TS_{min}$ and the predefined maximum packet size $TS_{max}$. This advantageously allows efficiently masking the shorter plaintexts packet sizes and, at the same time, reducing the bandwidth consumption entailed by the padding.

On the one hand, indeed, choosing the padding size PS so as to bring the plaintext packet to a random size comprised in a range superiorly limited by the maximum packet size $TS_{max}$ advantageously entails a bandwidth consumption lower than padding all the plaintext packets to such maximum packet size $TS_{max}$. Therefore, even if the maximum packet size $TS_{max}$ is set equal to the maximum packet size MTU allowed by the transmission protocol of the plaintext packets, the bandwidth consumption entailed by the padding according to the present invention is advantageously reduced in comparison with the above technique pad to MTU.

On the other hand, choosing the padding size PS so as to bring the plaintext packet to a random size comprised in a range inferiorly limited by the predefined minimum packet size $TS_{min}$ advantageously results in an efficient masking of the shorter plaintext packet sizes, namely of those lower than the minimum packet size $TS_{min}$. Encrypted packets carrying plaintext packets shorter than $TS_{min}$ can not indeed be distinguished from encrypted packets carrying plaintext packets longer than $TS_{min}$.

The step 305 of randomly selecting the padding size PS in a range comprised between the minimum padding size $PS_{min}$ and the maximum padding size $PS_{max}$ will be described in further detail.

Herein after, by way of non-limiting example, it is assumed that the encryption algorithm applied by the encryption unit 12 to the plaintext packets at step 308 is a block cipher encryption algorithm with a block size of B bytes (e.g. 16 bytes).

Under this assumption, upon reception of a plaintext packet of size L at step 300, first of all the value of L is preferably rounded up to the nearest integer multiple of B. Furthermore, the predefined minimum packet size $TS_{min}$ and predefined maximum packet size $TS_{max}$ are preferably set equal to integer multiples of B.

Then, at step 301 the maximum padding size $PS_{max}$ is preferably calculated as a difference between the predefined maximum packet size $TS_{max}$ and the rounded up value of L.

Similarly, at step 302 the padding unit 11 compares the rounded up value of L with the minimum packet size $TS_{min}$. Then, if the rounded up value of L is lower than the minimum packet size $TS_{min}$, at step 303 the minimum padding size $PS_{min}$ is preferably calculated as a difference between the predefined minimum packet size $TS_{max}$ and the rounded up value of L. Otherwise, $PS_{min}$ is set equal to 0 (step 304).

Then, at step 305 the padding size PS is preferably selected as a random integer multiple of B comprised between the minimum padding size $PS_{min}$ and the maximum padding size $PS_{max}$.

Then, at step 306 the padding content is generated, whose size is equal to the padding size PS as selected at step 305, increased by the difference between the rounded up value of L and the original value of L.

For instance, with reference to the above example of IP and IPsec protocols, if the block size B is equal to 16 bytes, $TS_{max}$ may be set equal to 1504 bytes (namely, 94 blocks of 16 bytes) and $TS_{min}$ may be set e.g. equal to 128 bytes (namely, 8 blocks of 16 bytes). If an IP packet of exemplary size L equal to 100 bytes is received, the value of L is preferably rounded up to 112 bytes, namely the nearest multiple integer of 16 bytes. At step 301 the maximum padding size $PS_{max}$ is therefore calculated as the difference between $TS_{max}$ and the rounded up value of L, namely 1504−112=1392 bytes. Further, since the rounded up value of L (112 bytes) is lower than $TS_{min}$ (128 bytes), at step 303 the minimum padding size $PS_{min}$ is calculated as the difference between $TS_{min}$ and the rounded up value of L, namely 128−112=16 bytes. Then, at step 305 the padding size PS is preferably selected as a random integer multiple of B=16 bytes comprised between the minimum padding size $PS_{min}$=16 bytes and the maximum padding size $PS_{max}$=1392 bytes, e.g. PS=400 bytes (namely, 25 blocks of 16 bytes). Hence, at step 306, a padding content is generated, whose size is equal to PS=400 bytes increased by 112−100=12 bytes, namely 412 bytes. This provides a padded plaintext packet of 100+412=512 bytes. The resulting padded plaintext packet size is an integer multiple of the block size B=16 bytes, and hence the block cipher encryption algorithm may be applied thereto.

As described above, in case of a block cipher encryption algorithm at step 305 the padding size PS is preferably selected as a random integer multiple of B comprised between the minimum padding size $PS_{min}$ and the maximum padding size $PS_{max}$.

Equivalently, at step 305 the padding size PS may be preferably selected as a random integer Z comprised between X and Y, wherein Z is the padding size PS expressed as number of blocks (namely, PS/B), X is the minimum padding size $PS_{min}$ expressed as number of blocks (namely, $PS_{min}$/B) and Y is the maximum padding size $PS_{max}$ expressed as number of blocks (namely, $PS_{max}$/B). According to the above example, X is equal to $PS_{min}$/B=16 bytes/16 bytes=1, while Y is equal to $PS_{max}$/B=1392 bytes/16 bytes=87. Hence, Z is a random integer selected in the range comprised between 1 and 87.

More specifically, the value of Z is provided by drawing one or more values of a discrete random variable z having a certain probability mass function $p_Z(z)$, which—as known—is the function which gives the probability that the discrete random variable z has a certain value. The probability mass function $p_Z(z)$ may be designed in different ways.

According to an embodiment, the probability mass function $p_Z(z)$ of the discrete random variable z is uniform between X and Y, meaning that all the integer numbers comprised between X and Y have a same probability of being selected. The probability mass function $p_Z(z)$ is therefore as follows:

$$\begin{cases} p_z(z) = k & \text{for } X \le z \le Y \\ p_z(z) = 0 & \text{for } z < X \text{ and } z > Y \end{cases} \quad [2]$$

where k is a real constant whose value may be calculated by applying the constraint that the summation of all the values of the probability mass function $p_Z(z)$ for z comprised between X and Y equals 1, namely:

$$\sum_{z=X}^{Y} p_z(z) = 1 \quad [3]$$

By applying the constraint [3] to the probability mass function $p_Z(z)$ as per equation [2], the value of the real constant k results to be 1/(Y−X+1).

According to this embodiment, the padding unit 11 preferably assigns to Z to first drawn value of the discrete random variable z. This results in a size of the padded plaintext packet statistically uniformly distributed between the minimum packet length $TS_{min}$ and the maximum packet length $TS_{max}$.

According to other embodiments, the probability mass function $p_Z(z)$ is not constant between X and Y, meaning that the integer numbers comprised between X and Y have different probabilities of being drawn. In particular, according to advantageous embodiments, the probability mass function $p_Z(z)$ is decreasing from a maximum value at z=X and a minimum value at z=Y.

According to an advantageous variant, the probability mass function $p_Z(z)$ linearly decreasing from its maximum value at z=X to its minimum value at z=Y. The probability mass function $p_Z(z)$ according to this variant is therefore as follows:

$$\begin{cases} p_z(z) = A_z + B & \text{for } X \le z \le Y \\ p_z(z) = 0 & \text{for } z < X \text{ and } z > Y \end{cases} \quad [4]$$

where A and B are, respectively, the slope (negative) and the intercept (positive) of the linear function. The values of A and B may be calculated by applying the following constraints:

(i) the summation of all the values of the probability mass function $p_Z(z)$ for z comprised between X and Y equals 1, see above equation [3]; and (ii) the ratio between its maximum value at z=X and its minimum value at z=Y is equal to a desired value RP>1, namely:

$$\frac{p_z(z=X)}{p_z(z=Y)} = RP \quad [5]$$

The value RP is preferably set in order to balance a trade-off between cost due to the extra-bandwidth required by padding and capability of hiding the plaintext packets size. The higher RP, the lower the extra-bandwidth required by padding. However, the higher RP, the lower the capability of hiding the original sizes of the plaintext packets. To balance such trade-off, RP is preferably comprised between 2 and 5. The value of the probability mass function $p_Z(z)$ for each value of z comprised between X and Y may then be determined by replacing the calculated values of A and B in equation [4] above.

These values may also be calculated as follows.

First of all, a first array AP(j) is provided, j being an index ranging between 1 and N=Y−X+1. The elements of the first array AP(j) have linearly decreasing values from j=1 to j=N. In particular, the difference between consecutive elements AP(j−1)−AP(j) is constant and equal to Δ=RP−1. This way, the value of the first element AP(1) is RP times the value of the last element AP(N).

The first element AP(1) is preferably set to a certain value, e.g. RP(Y−X). The values of the other elements AP(j) with j>1 are calculated accordingly, namely:

$$AP(2) = AP(1) - \Delta = RP(Y - X) - (RP - 1);$$
$$AP(3) = AP(2) - \Delta = RP(Y - X) - 2(RP - 1);$$
$$\ldots$$
$$AP(N) = AP(N - 1) - \Delta = RP(Y - X) - (N - 1)(RP - 1) = Y - X;$$

The first array AP(i) allows determining the values of the probability mass function $p_Z(z)$ for each value of z comprised between X and Y. In particular, each value of the probability mass function $p_Z(z)$ is obtained by dividing the corresponding element of the first array AP(j) by the summation of all the elements of the first array AP(j), as follows:

$$p_z(z) = \frac{AP(z - X + 1)}{\sum_{j=1}^{N} AP(j)} \quad [6]$$

According to an embodiment of the present invention, in order to provide Z as the value of a random variable z having a probability mass function $p_Z(z)$ linearly decreasing from its maximum value at z=X to its minimum value at z=Y, at step 305 the padding unit 11 may execute the following algorithm.

First of all, a second array APC(i) is preferably provided, where i is an index ranging between 1 and N=Y−X+1. Each element of the second array APC(i) is preferably calculated based on the values of the elements of the first array AP(j) as follows:

$$APC(i) = \sum_{j=1}^{i} AP(j)$$

By applying this formula, it follows that the elements of the second array APC(i) have increasing values and that the last element of the array APC(N) has the following value:

$$APC(N) = \sum_{j=1}^{i} AP(j).$$

For instance, if X=1, Y=10 and RP=3, the elements of the first array AP(j) have the following values: AP(i)=27, AP(2)=25, AP(3)=23, . . . AP(10)=9. Hence, the elements of the second array APC(i) (i=1, . . . Y−X+1) are as follows:
APC(1)=AP(1)=27;
APC(2)=AP(1)+AP(2)=27+25=52;
APC(3)=AP(1)+AP(2)+AP(3)=52+22=75.
And so on.

Then, a random number R is drawn in a range comprised between 1 and APC(N). Preferably, the probability mass function of the random variable r providing the random integer R is constant for r between 1 and APC(N), while it is 0 for r<1 and r>APC(N).

The drawn random number R is then preferably compared with every element of the second array APC(i) in an ordered way, starting from the first element APC(1). The first time the random number R results to be lower than or equal to one element APC(i*) of the second array, then Z is set equal to X+i*−1.

For instance, with reference to the above exemplary values of APC(i), it is assumed that R=55. This number R=55 is firstly compared with APC(1)=27. Since R=55 is higher than APC(1)=27, R=55 is then compared with the subsequent element APC(2)=52. Since R=55 is still higher than APC(2)=52, R=55 is then compared with the subsequent element APC(3)=75. Since R=55 is finally lower than APC(3)=75, i*=3 and therefore Z is set equal to X+i*−1=1+3−1=3.

This procedure may be formalized as follows:

```
Z=−1;
i=0;
r=random(1,APC(Y−X+1))
while (Z=−1)
    i=i+1
    if r≤APC(i) then Z=X+i−1
endwhile
```

Figure 4:
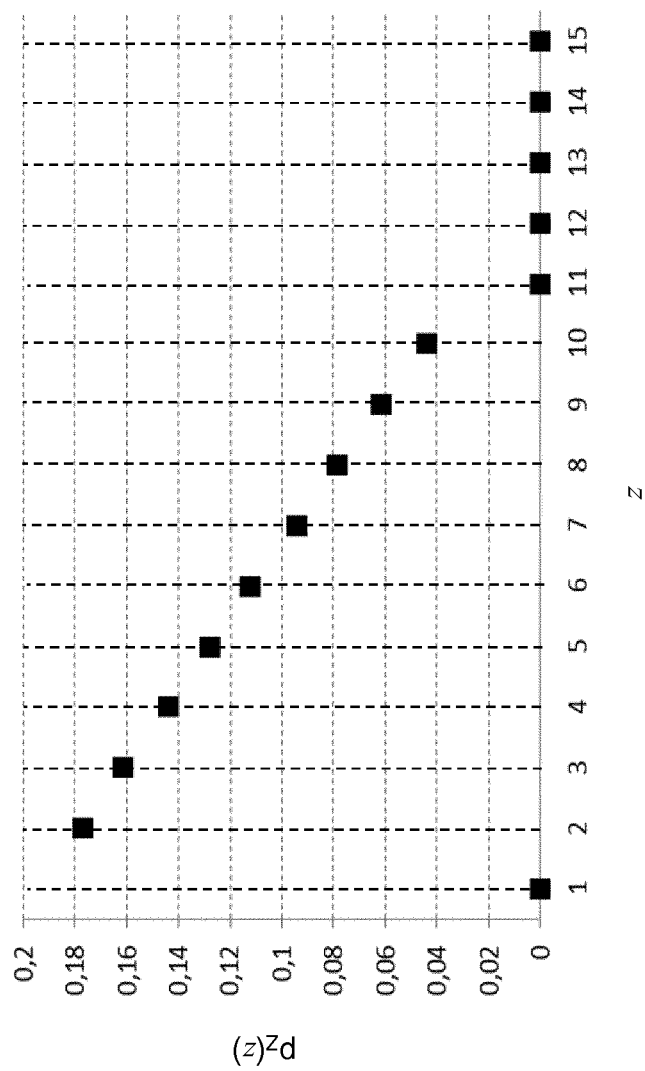
FIGS. 4, 5 and 6 show exemplary probability mass functions according to three advantageous variants of the present invention.

FIG. 4 shows a graph of an exemplary linearly decreasing probability mass function $p_Z(z)$, wherein X=2, Y=10 and RP=4. It may be appreciated that the value of the probability mass function $p_Z(z)$ linearly decreases from a maximum value 0.177 at z=X=2 to a minimum value 0.044 at z=X=10, while it is equal to 0 in the ranges z<2 and z>10.

Since the probability mass function $p_Z(z)$ has higher values in the lower part of the range comprised between X and Y, values of z closer to X are more likely drawn than values of z closer to Y. This results in a padded plaintext packet whose random size is more likely closer to the minimum packet length $TS_{min}$, than to the maximum packet length $TS_{max}$.

This advantageously provides a further reduction of the bandwidth required on the average by padding, relative to the embodiment with probability mass function $p_Z(z)$ constant between X and Y, because the average size of the padded plaintext packets (and then of the encrypted packets) is shifted towards shorter sizes.

This also allows masking the shorter packets in a still more effective way. Indeed, while longer encrypted packets may derive from either shorter plaintext packets or longer plaintext packets, shorter encrypted packets certainly derive from shorter plaintext packets. While guaranteeing that the encrypted packet size is never lower than the predefined minimum size $TS_{min}$ is a first measure for "hiding" encrypted packets carrying shorter plaintext packets, a statistical distribution of the encrypted packets concentrated towards the minimum packet size $TS_{min}$ enhances the "hiding" effect, because shorter encrypted packets become more frequent. Hence, identification of shorter encrypted packets carrying shorter plaintext packets amongst such an increased number of shorter encrypted packets becomes more difficult.

According to another advantageous variant, the probability mass function $p_Z(z)$ is not linearly decreasing from its maximum value at z=X to its minimum value at z=Y.

According to an embodiment of the present invention, in order to provide a padding size Z (in number of blocks) randomly chosen between X and Y with a not linearly decreasing probability mass function $p_Z(z)$ between X and Y, at step 305 the padding unit 11 preferably performs the following steps:

providing a random integer R indicating the number of draws to be performed;

drawing R random integers $T_1, T_2, \ldots T_R$ comprised between X and Y; and setting Z equal to the minimum one amongst the R drawn random integers, namely $Z=\min\{T_1, T_2, \ldots T_R\}$.

Preferably, the probability mass function $p_R(r)$ of the random variable r providing the random integer R is constant between 1 and a predefined maximum number of draws NMS, while it is zero for r<1 and r>NMS. NMS is preferably comprised between 2 and 4.

Further, preferably, the probability mass function $p_T(t)$ of the random variable t providing the R random integers $T_1, T_2, \ldots T_R$ is constant between X and Y, while it is zero for t<X and t>Y.

The algorithm implementing the above steps may be formalized as follows:

```
R=random(1,NMS);
Z=Y;
for i=1 to R
    temp=random(X,Y);
    if (temp<Z) then Z=temp;
end.
```

It may be appreciated that, according to this procedure, Z is equal to Y only when Y is the minimum amongst the R drawn random integers $T_1, T_2, \ldots T_R$. This situation only happens if:

(i) a single draw is performed (R=1), whose result is Y; or (ii) R>1 draws are performed, and the result is always Y.

The latter case (ii) is very rare, especially if NMS>2. Hence, it has a negligible impact on the value of the probability mass function $p_Z(z)$ at z=Y. Hence, considering only the case (i), the probability of having Z equal to Y by applying the above algorithm is:

$$p_z(z = Y) = \frac{1}{N} \cdot \frac{1}{NMS} \qquad [7]$$

where N=Y−X+1 is the number of possible values of z. Hence, the probability of having Z equal to Y is equal to the product between 1/NMS (namely, the probability of having a certain number R of draws) and 1/N (namely, the probability to draw Y at each draw).

As to case (ii), Y is the minimum of the drawn values only if Y is always drawn, independently of the number of draws. Therefore:

$$p_z(z = Y) = \qquad [8]$$
$$\frac{1}{N*NMS} + \frac{1}{N^2*NMS} + \cdots \frac{1}{N^{NMS}*NMS} = \sum_{i=1}^{NMS} \frac{1}{N^i} \cdot \frac{1}{NMS}$$

where the $i^{th}$ term of the summation is the probability of performing a number R of draws equal to i, whose result is always Y.

Besides, the probability that the padding size Z is equal to a certain value z comprised between X and Y may be determined as follows. The padding size Z is equal to z if, independently of the number of draws, the result of each draw is z, but not all the drawn values are >z. Therefore:

$$p_z(z) = \frac{1}{N*NMS} + \sum_{i=2}^{NMS}\left[\left(\frac{N-z+1}{N}\right)^i \frac{1}{NMS} - \left(\frac{N-z}{N}\right)^i \frac{1}{NMS}\right] \qquad [9]$$

This equation may be rewritten as:

$$p_z(z) = \frac{1}{N*NMS} + \frac{1}{NMS}\sum_{r=2}^{NMS}\left[\left(\frac{N-z+1}{N}\right)^i - \left(\frac{N-z}{N}\right)^i\right] \qquad [9']$$

where $$\frac{1}{N*NMS}$$

is the probability of having a single draw providing a certain value, $$\left(\frac{N-z+1}{N}\right)^i$$

is the probability of having a number R of draws equal to i and all providing values ≥z, and $$\left(\frac{N-z}{N}\right)^i$$

is the probability of having a number R of draws equal to i providing values >z. This equation may also be rewritten in a simplified form, namely:

$$p_z(z) = \frac{1}{NMS}\sum_{i=1}^{NMS}\frac{(N-z+1)^i - (N-z)^i}{N^i} \qquad [9'']$$

Figure 5:
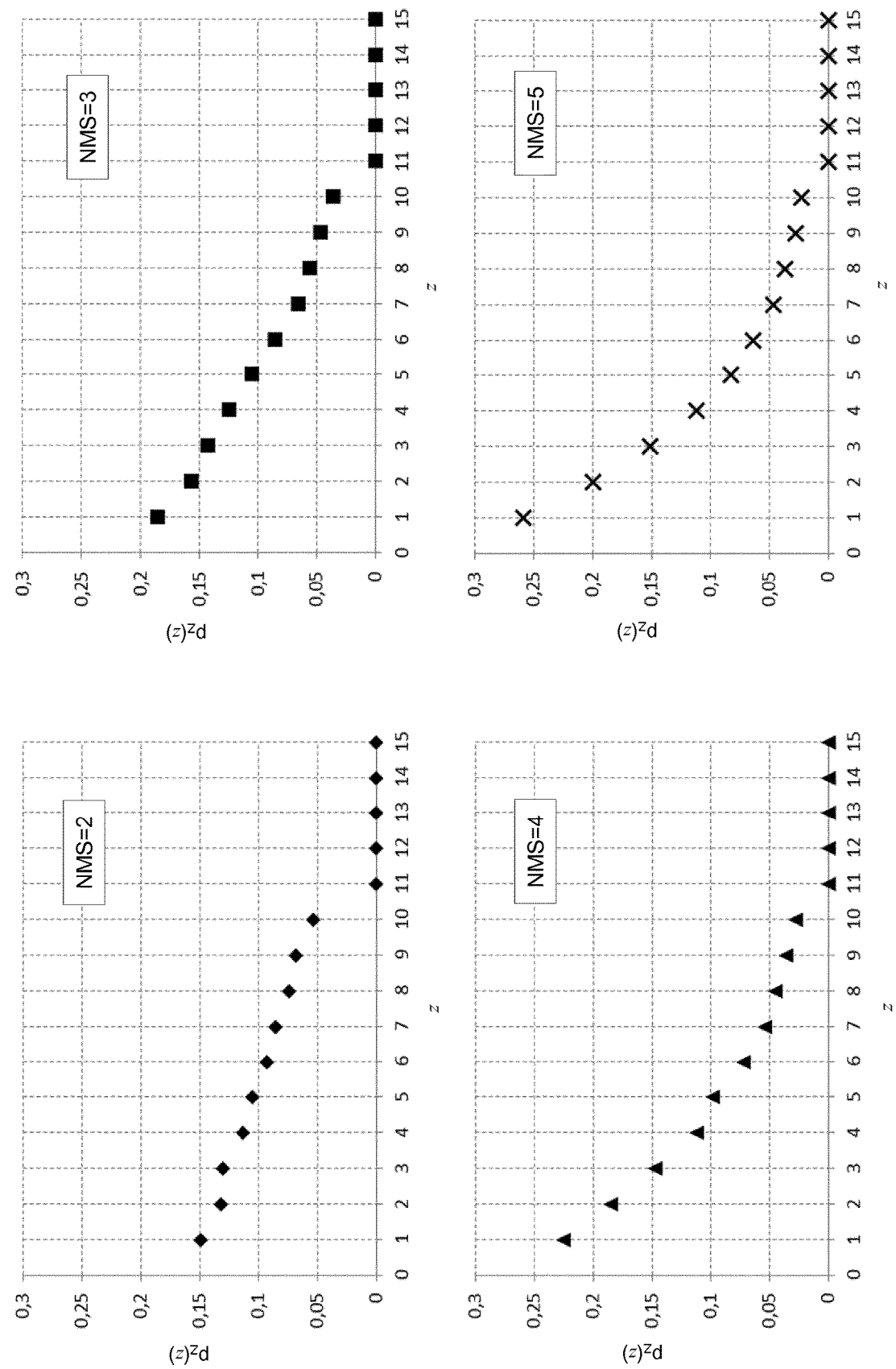

FIG. 5 shows a graph of an exemplary non-linearly decreasing probability mass function $p_Z(z)$ obtained as described above, with X=1, Y=10 and four different values of NMS, namely 2, 3, 4 and 5. The values shown in FIG. 5 have been calculated by applying equation [9]". It may be appreciated that, for all the graphs, the probability mass function $p_Z(z)$ non-linearly decreases from a maximum value at X=1 to a minimum value at Y=10. As NMS increases, the ratio RP between the maximum value of $p_Z(z)$ at z=X and the minimum value of $p_Z(z)$ at z=Y increases and, at the same time, the non-linearity of the function $p_Z(z)$ between X and Y increases (namely, its concavity or second derivative increases). Both such effects result in a probability mass function $p_Z(z)$ which, as NMS increases, is increasingly concentrated towards the minimum value X=1.

Hence, by tuning the value NMS is it possible to balance the above mentioned trade-off between cost of the extra-bandwidth required for transmitting the padding (higher value of NMS) and capability to effectively hide the original size of the plaintext packets (lower value of NMS).

According to another embodiment, in order to provide a padding size Z (in number of blocks) randomly chosen between X and Y with a not linearly decreasing probability mass function $p_Z(z)$ between X and Y, at step 305 the padding unit 11 preferably performs the following steps:

- providing a random integer R comprised between 1 and NMS, indicating the number of draws to be performed;
- providing a random integer S comprised between 1 and R;
- drawing S random integers $T_1, T_2, \ldots T_S$ comprised between X and Y; and
- setting Z equal to the minimum one amongst the S drawn random integers, namely $Z=\min\{T_1, T_2, \ldots T_S\}$.

Preferably, the probability mass function $p_R(r)$ of the random variable r providing the random integer R is constant between 1 and a predefined maximum number of draws NMS, while it is zero for $r<1$ and $r>$NMS.

Further, preferably, the probability mass function $p_S(s)$ of the random variable s providing the random integer S is constant between 1 and R, while it is zero for $s<1$ and $s>R$.

Further, preferably, the probability mass function $p_T(t)$ of the random variable t providing the S random integers $T_1$, $T_2, \ldots T_S$ is constant between X and Y, while it is zero for $t<X$ and $t>Y$.

The double-step draw of the number S results in a probability mass function $p_Z(z)$ even more concentrated towards the minimum value X.

The probability mass function $p_S(s)$ of the random variable s may indeed be determined by considering that the value s is obtained if two events occur, namely (i) the first draw provides a value of R equal to $r \geq s$ and (ii) the second draw provides a value of S equal to s. The probability of (i) is 1/NMS, while the probability of (ii) is 1/r. For determining the value of the probability mass function $p_S(s)$ for a certain value s, the summation shall be calculated, for all the values r s, of the probabilities that the first draw provides R equal to r and the second draw provides S equal to s, namely:

$$p_s(s) = \sum_{r=s}^{NMS} \frac{1}{NMS} \cdot \frac{1}{r} = \frac{1}{NMS} \sum_{r=s}^{NMS} \frac{1}{r} \quad [10]$$

Hence, the probability that the padding size Z is equal to a certain value z comprised between X and Y may be determined by combining the above equation [9"] by equation [10] as follows:

$$p_z(z) = \frac{1}{NMS} \cdot \sum_{i=1}^{NMS} \left[ \frac{(N-z+1)^i - (N-z)^i}{N^i} \cdot \sum_{r=1}^{NMS} \frac{1}{r} \right] \quad [11]$$

Figure 6:
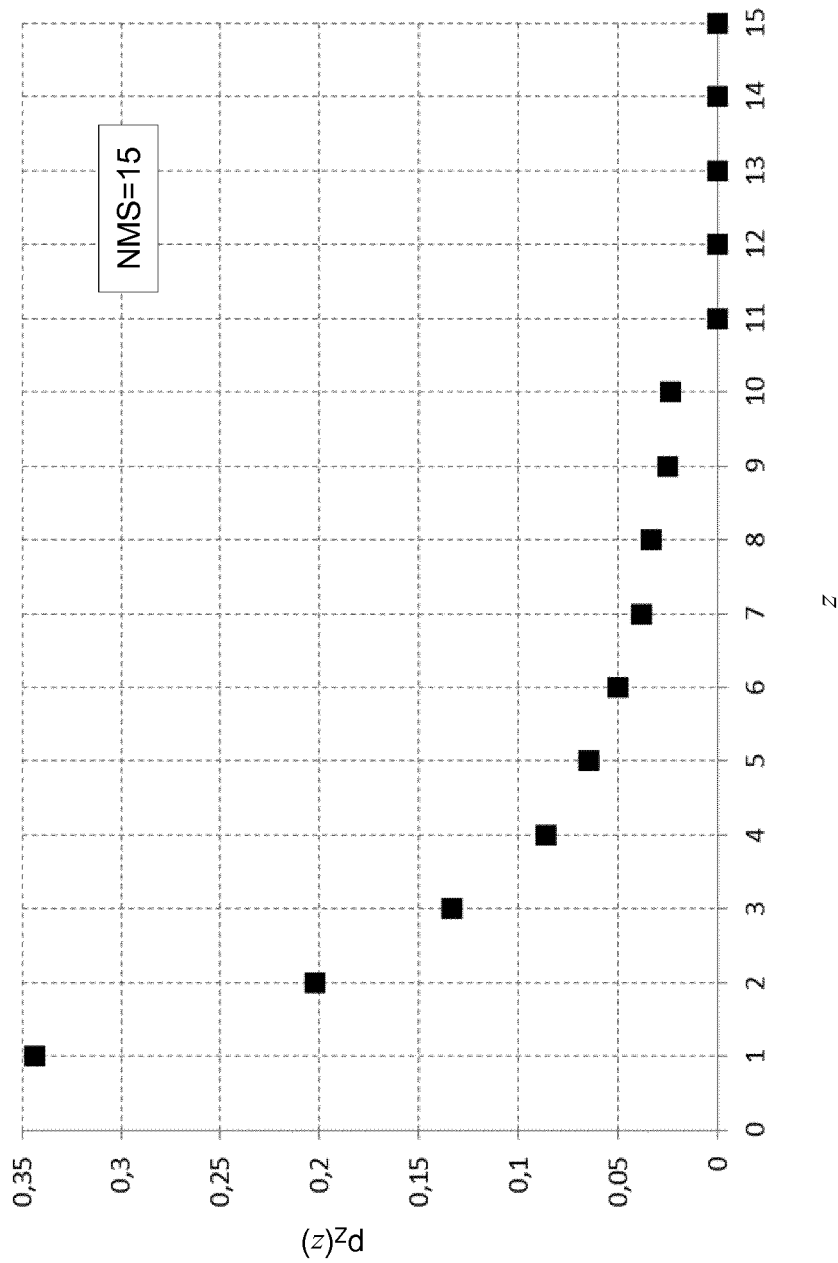

FIG. 6 shows a graph of an exemplary non-linearly decreasing probability mass function $p_Z(z)$ obtained as described above, with X=1, Y=10 and NMS=15. The values shown in FIG. 6 are obtained by numerical simulations. It may be appreciated that the probability mass function $p_Z(z)$ non-linearly decreases from a maximum value at X=1 to a minimum value at Y=10.

The inventors have conducted numerical simulations to estimate the ratio between the maximum value of the probability mass function $p_Z(z=X)$ and the minimum value of the probability mass function $p_Z(z=Y)$ for different values of NMS, both for the first non-linear function of equation [9"] and for the second non-linear function of equation [11].

Figure 7:
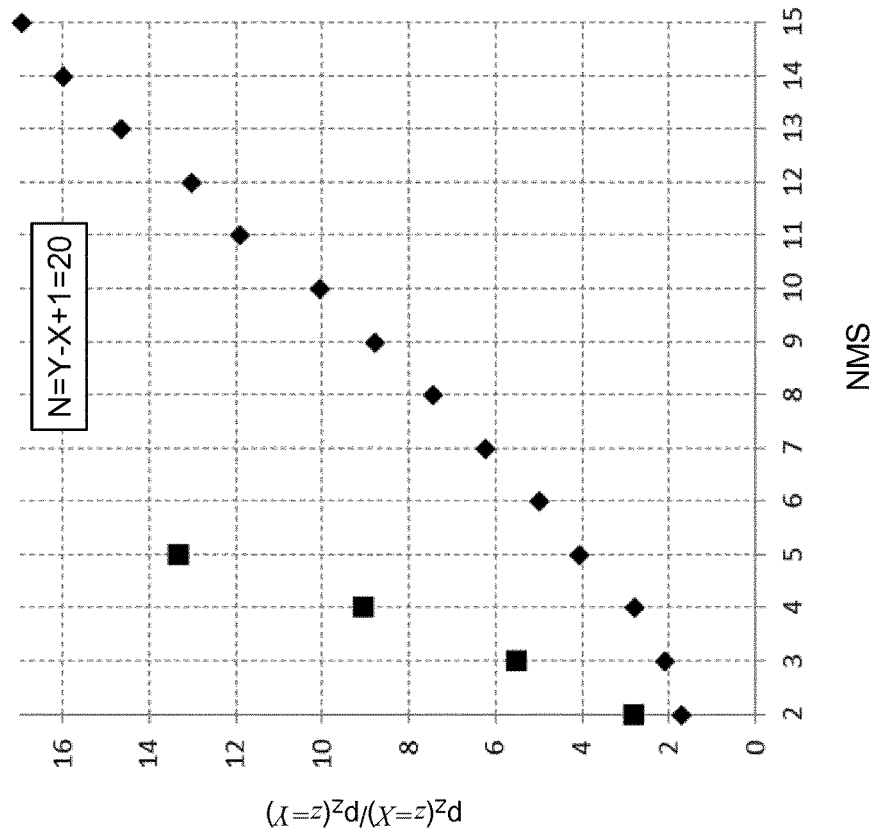
FIG. 7 shows results of numerical simulations carried out by the Applicant.
Figure 7:
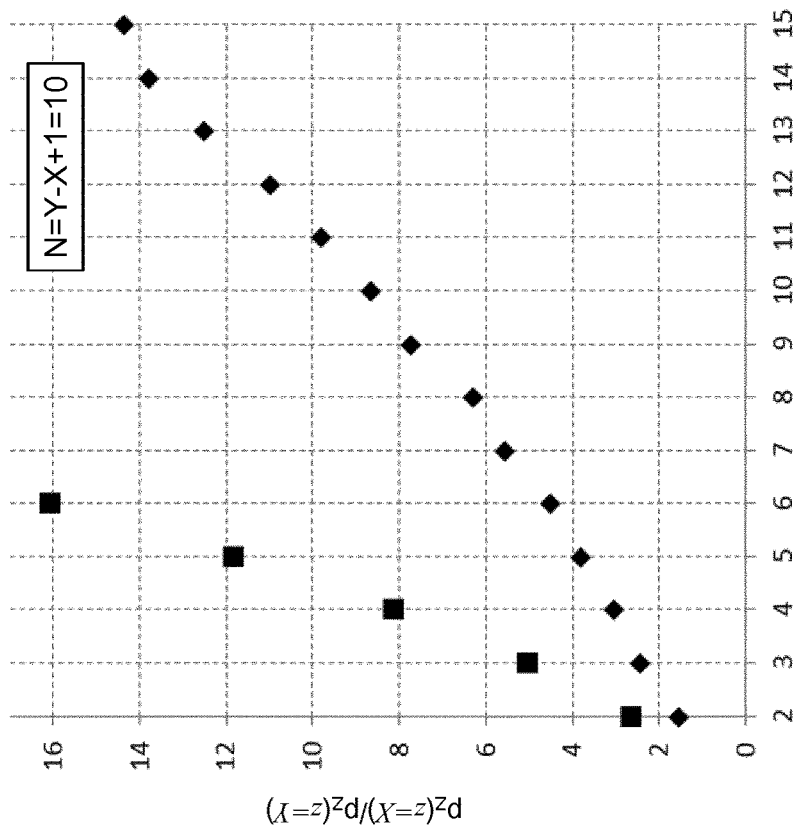

The results are summarized in the graph of FIG. 7.

The simulations have been carried out for values of NMS ranging between 2 and 6 for the first non-linear function and for values of NMS ranging between 2 and 15 for the second non-linear function. For both functions, two different values of N=Y−X+1 (namely, the possible values of Z) have been considered, namely N=10 (left-hand graph) and N=20 (right-hand graph).

It may be appreciated that, in both cases, the simulations have confirmed that both functions exhibit an increasing ratio RP=$p_Z(z=X)/p_Z(z=Y)$ as the value of NMS increases. The increase is however much faster for the first non-linear function, because the higher then number of draws, the higher the probability that the drawn number is low.

Assuming that a ratio RP=$p_Z(z=X)/p_Z(z=Y)$ comprised between 2 and 5 is desired (which, as discussed above, provides a good balance between cost of the extra-bandwidth required for transmitting padding and capability to hide the shorter plaintext packets), if N=10 this may be achieved either by using the first non-linear function with NMS equal to 2 or 3, or by using the second non-linear function with NMS comprised between 2 and 7. The same ratio $p_Z(z=X)/p_Z(z=Y)$ may be achieved, if N=20, either by using the first non-linear function with NMS equal to 2 or 3, or by using the second non-linear function with NMS comprised between 2 and 6.

Though, in the preceding description, only two exemplary non-linear decreasing probability mass functions have been described, according to other embodiments other non-linear decreasing probability functions may be provided.

While the first and second non-linear probability mass functions as described above are obtained by performing a single-step draw and a two-step draw, respectively, of the number of draws providing the set of integers whose minimum is set equal to Z, more generally a non-linear probability mass function may be obtained by performing an N-step draw of the number of draws providing the set of integers whose minimum is set equal to Z. Specifically, at each step a random number $R_i$ is drawn (i=1, 2, ... N), where $R_1$ is drawn between 1 and NMS, while each subsequent $R_i$ (i=2, N) is drawn between 1 and $R_{i-1}$. Therefore, $R_2$ is drawn between 1 and $R_1$, $R_3$ is drawn between 1 and $R_2$ and so on, until the random number $R_N$ is drawn. Then, $R_N$ random integers are drawn between X and Y, and Z is set equal to their minimum.

According to other variants, another non-linearly decreasing probability mass function may be obtained by drawing N random numbers $R_1, R_2, \ldots R_N$ between 1 and NMS, and then by setting $R_{min}$ equal to their minimum $R_{min}=\min\{R_1, R_2, \ldots R_N\}$. Then, $R_{min}$ random integers are drawn between X and Y, and Z is set equal to their minimum.

According to still further embodiments, the probability mass function $p_Z(z)$ of the random variable z providing the padding size Z preferably is variable over time.

In particular, in case the probability mass function $p_Z(z)$ is a linearly or non-linearly decreasing function between X and Y, the slope of the probability mass function $p_Z(z)$ may be varied over time.

For instance, in case of a non-linearly decreasing probability mass function $p_Z(z)$ as described above, its slope may be changed over time by periodically changing the maximum number of draws NMS.

According to first variants, the probability mass function $p_Z(z)$ is changed based on the network access point (e.g. enodeB for LTE networks). According to such variants, besides periodically changing the maximum number of draws NMS, each network access point also preferably changes the ratio RP between the maximum value at z=X and the minimum value at z=Y of the probability mass function $p_Z(z)$. New values of the maximum number of draws NMS and of the ratio RP may be provided every Tb seconds. The duration of Tb may be also changed, e.g. it may be randomly selected in as range comprised between a minimum duration and a maximum duration.

According to other variants, the probability mass function $p_Z(z)$ is changed on a client or session basis, e.g. for each mobile terminal connected to the communication network 100. According to these variants, for every new user both the maximum number of draws NMS and the ratio RP are preferably selected. If a client is connected beyond a certain maximum time, its NMS and RP may be varied over time.

The first technique is simpler but more expensive, while the second technique is more complex but less expensive, from the network operator point of view.

For instance, it is assumed that NMS varies between 2 and 4. The first technique is more expensive because, if a less steep probability mass function is provided (namely, NMS=2), the extra-bandwidth required by transmission of padding is increased, relative to that obtained with NMS equal to 3 or 4. This is because the percentage of "longer" padded plaintext packets is increased. The communication network 100 shall accordingly be tailored based on the worst case (minimum slope of $p_Z(z)$, namely NMS=2.

On the other hand, the second technique is less expensive, because different clients typically have different values of NMS at the same time. In any case, it is unlikely that all clients apply NMS=2 at the same time. In this case, therefore, the communication network 100 may be tailored based on an average extra-bandwidth needed by the clients as a whole for transmitting the padding.

The invention claimed is:

1. A method for transmitting encrypted packets from a first node to a second node of a communication network, said method comprising, at said first node:
   padding a plaintext packet with padding content to provide a padded plaintext packet;
   providing an encrypted packet by encrypting said padded plaintext packet; and
   transmitting said encrypted packet from said first node to said second node,
   wherein said padding content has a padding size and wherein said padding comprises selecting said padding size in a range comprised between a minimum padding size and a maximum padding size, wherein said padding size is selected as an integer Z comprised between a minimum value X and a maximum value Y, by drawing one or more values of a discrete variable z having a probability mass function $pZ(z)$ between X and Y,
   wherein, if a size of said plaintext packet is lower than a predefined minimum packet size, said minimum padding size is equal to a difference between said predefined minimum packet size and the plaintext packet size.

2. The method according to claim 1 wherein, if said size of said plaintext packet is equal to or higher than said predefined minimum packet size, said minimum padding size is set equal to 0.

3. The method according to claim 1, wherein said maximum padding size is equal to a difference between a predefined maximum packet size and the plaintext packet size.

4. The method according to claim 1, wherein Z is said padding size expressed in a number of blocks of B bytes, X is said minimum padding size expressed in a number of blocks of B bytes and Y is said maximum padding size expressed in a number of blocks of B bytes, said providing comprising encrypting said padded plaintext packet by applying a block cipher encryption algorithm with a block size of B bytes.

5. The method according to claim 4, wherein said probability mass function $pz(z)$ is constant for z comprised between X and Y.

6. The method according to claim 4, wherein said probability mass function $pz(z)$ is a decreasing function for z comprised between X and Y, said probability mass function $pz(z)$ having a maximum value at z=X and a minimum value at z=y, the ratio between said maximum value and said minimum value having a value RP.

7. The method according to claim 6, wherein said probability mass function $pz(z)$ is variable over time and/or on a client or session basis.

8. The method according to claim 6, wherein said probability mass function $pz(z)$ is a linearly decreasing function for z comprised between X and Y.

9. The method according to claim 6, wherein said probability mass function $pz(z)$ is a non-linearly decreasing function for z comprised between X and Y.

10. The method according to claim 8, wherein said integer Z is selected by:
    providing a first array AP(j), j being an index ranging between 1 and N=Y−X+1, with AP(j−1)−AP(j)=RP−1;
    providing a second array APC(i), i being an index ranging between 1 and N=Y−X+1, wherein:

$$APC(i) = \sum_{j=1}^{i} AP(j)$$

drawing a integer R in a range comprised between 1 and APC(N), a probability mass function of a variable r providing the integer R being constant for r between 1 and APC(N); and
   the integer R is compared with every element of said second array APC(i) in an ordered way, starting from a first element APC(1), the first time said integer R is lower than or equal to one element APC(i*) of said second array, then Z is set equal to X+i*−1.

11. The method according to claim 9, wherein said integer Z is selected by:
    drawing an integer R comprised between 1 and a maximum number of draws NMS, indicating a number of draws to be performed;
    drawing R integers $T_1, T_2, \ldots T_R$ comprised between X and Y; and
    setting Z equal to the minimum one amongst said R drawn integers $T_1, T_2, \ldots T_R$,
    wherein a probability mass function $p_R(r)$ of a variable r providing the integer R is constant between 1 and NMS, and
    wherein a probability mass function $p_T(t)$ of a variable t providing the R integers $T_1, T_2, \ldots T_R$ is constant between X and Y.

12. The method according to claim 9, wherein said integer Z is selected by:
    drawing a number N>1 of integers $R_1, R_2, \ldots R_N$, $R_1$ being selected between 1 and a maximum number of draws NMS and $R_i$ with i>1 being selected between 1 and $R_{i-1}$;
    drawing $R_N$ integers comprised between X and Y; and
    setting Z equal to the minimum one amongst said $R_N$ drawn integers, wherein a probability mass function $p_R(r)$ of a variable r providing the N integers $R_1, R_2, \ldots R_N$ is constant, and wherein a probability mass function $p_T(t)$ of a variable t providing the $R_N$ integers is constant between X and Y.

13. The method according to claim 9, wherein said random integer Z is selected by:

drawing N>1 integers $R_1, R_2, \ldots R_N$ comprised between 1 and a maximum number of draws NMS;

setting $R_{min}$ equal to the minimum one amongst the N integers $R_1, R_2, \ldots R_N$;

drawing $R_{min}$ integers comprised between X and Y; and setting Z equal to the minimum one amongst said $R_{min}$ drawn integers, wherein a probability mass function $p_R(r)$ of a variable r providing the N integers $R_1, R_2, \ldots R_N$ is constant between 1 and NMS, and wherein a probability mass function $p_T(t)$ of a variable t providing the $R_{min}$ integers is constant between X and Y.

14. A node for a packet switched communication network, said node comprising:

a padding unit configured to pad a plaintext packet with padding content to provide a padded plaintext packet;

an encryption unit configured to provide an encrypted packet by encrypting said padded plaintext packet; and a transmitting unit configured to transmit said encrypted packet from said node to a further node of said communication network, wherein said padding unit is configured to generate said padding content with a padding size, by selecting said padding size in a range comprised between a minimum padding size and a maximum padding size, wherein said padding size is selected as an integer Z comprised between a minimum value X and a maximum value Y, by drawing one or more values of a discrete variable z having a probability mass function pZ(z) between X and Y, wherein, if a size of said plaintext packet is lower than a predefined minimum packet size, said padding unit is configured to set said minimum padding size equal to a difference between said predefined minimum packet size and the plaintext packet size.

15. A communication network comprising at least a node according to claim 14.

* * * * *